Sept. 26, 1967  J. S. BISHOP ETAL  3,344,297
WINDING SUPPORT SYSTEM FOR A DYNAMOELECTRIC MACHINE
Filed July 28, 1965
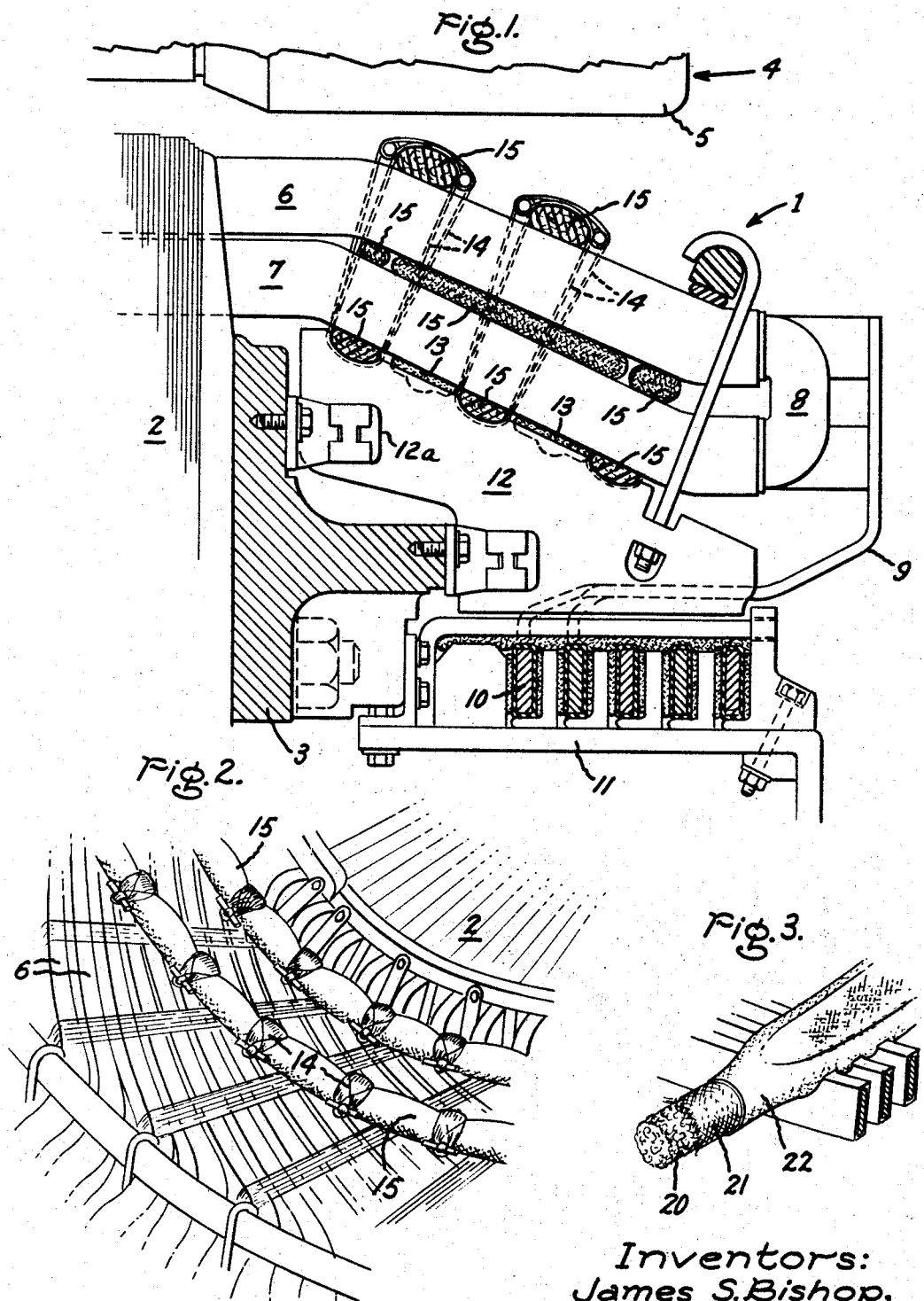
Inventors:
James S. Bishop,
Almy D. Coggeshall,
by W. C. Crutcher
Their Attorney.

United States Patent Office 3,344,297
Patented Sept. 26, 1967

3,344,297
WINDING SUPPORT SYSTEM FOR A
DYNAMOELECTRIC MACHINE
James S. Bishop, and Almy D. Coggeshall, both of Schenectady, N.Y., assignors to General Electric Company, a corporation of New York
Filed July 28, 1965, Ser. No. 475,373
9 Claims. (Cl. 310—260)

ABSTRACT OF THE DISCLOSURE

Dielectric support member of conformable impregnable material, resin-curable to rigid state, conformed to supported conductor members of dynamoelectric machine stator.

Background of the invention

This invention relates generally to a supporting structure. More particularly, it relates to an improved structure for the rigid support of spaced conductor members which are subject to forces tending to distort them and which are so arranged as to leave little room for elaborate support structure.

One environment for the use of this improved support is in electrical apparatus such as dynamoelectric machines or generators of high capacity. In the stator or armature windings of a generator there are high currents producing powerful magnetic fields and considerable heat. In the body of the stator, the windings are held firmly within the stator slots by wedges. However, outside the stator body, the end portions of the windings present support problems.

The end turns of a dynamoelectric machine stator are the projecting portions of the armature bars which extend outwardly from longitudinal stator slots. The end turns are necessary in order to reverse the direction of the armature bar and to circumferentially displace the end of the bar so that it can enter a slot almost 180° from the slot from which it emerged. The end turns must also diverge radially from the stator axis in order that they will not obstruct the rotor of the dynamoelectric machine which is turning in the stator bore. Consequently, the stator end turns assume a rather complicated configuration in that they are skewed with respect to the stator axis and lie generally tangentially about a frusto-conical surface of revolution concentric with the stator axis. When there are two separate armature bars in each slot, these being known as "top" or radially inner, and "bottom" or radially outer bars, one practice is to bend the top bars so that they lie tangentially in one direction about this frusto-conical surface and to bend the bottom bars in the opposite tangential direction about the surface of revolution. Furthermore, although the top and bottom bars are closely adjacent at the location where they emerge from the slot, they must spread radially with respect to one another as they move away from the stator so that space will be afforded for a series loop connecting a top bar to a bottom bar.

A suitable structure for supporting the insulated armature bars in the end turn region must afford support despite thermal expansions and contractions of the bars, and magnetic forces on them resulting from the high currents. Moreover, it must be of a dielectric material so as not to give rise to undesirable eddy currents or short circuits. Furthermore, it would be desirable to make the support structure as simple as possible because of the limited space for its accommodation. Since the spaces in which it must fit are irregular, the structure should be able to conform to the irregularities to provide uniform support.

Previous support structures have included conductors lashed to rigid axial members or rigid annular rings or various combinations of these. Also conforming pads of pliable material which will cure to a rigid state have been used to obtain better conformance between the rigid conductors and the rigid support members. However, such structures tend to be complicated due to use of a number of different parts.

Accordingly, it is an object of the present invention to provide an improved support structure of dielectric material for the end windings of a generator stator.

Another object is to provide a support ring composed of inorganic fibrous material surrounded by a high strength fabric and impregnated with a curable resin.

Another object is to provide a support ring which provides strength and conformability in a single unified mass.

Other objects, advantages and features of this invention will become apparent from the following detailed description of one embodiment thereof when taken in connection with the accompanying drawing.

Summary of the invention

Briefly stated, the essence of this invention comprises the use of an absorbent fibrous material core, surrounded by a high strength fabric and impregnated with a resin which is curable, either at room temperature or at an elevated temperature, after the whole is inserted as blocking so that it conforms to the shape of its abutting members and cures to a strong rigid state.

Drawing

In the drawings:

FIG. 1 is a horizontal elevation partly in section showing the support system of this invention at one end of a generator stator.

FIG. 2 is a perspective view of the inside and end portions of a generator stator looking substantially along its axis.

FIG. 3 is a cutaway view showing the construction of one composite ring of this invention.

Description

Referring now to FIG. 1, a lower end portion of a generator stator frame generally indicated at 1 is shown having a stator core 2 and a circumferential flange 3 mounted on each end thereof. Rotor 4 with its retaining rings 5 rotates within stator 1. Radially inner armature or stator conductor bars 6 and radially outer armature or stator conductor bars 7 extend longitudinally through slots in stator 1 and when these bars leave the stator slots they are bent radially outwardly to accommodate their end supporting structure. Furthermore, as shown in FIG. 2, the inner bars are bent in one circumferential direction and the outer bars are bent in the other circumferential direction. This is done so that each inner bar may be joined by a series loop 8 with an outer bar emanating from a stator slot 180° away. In other words, an inner bar on one side of the stator circumference is connected with an outer bar diametrically opposite by a series loop. It will be understod that series loop 8, as shown, is rotated into the plane of the drawing in FIG. 1 in order to show a proper spacing of the members in their radial relationship and that it does not actually connect the bars 6 and 7 emanating from the same slot.

Output current is withdrawn from the armature windings through flexible leads 9 passing to circumferential collecting bars 10 which are in turn connected to high voltage outlet terminals (not shown).

Shown generally at 11 is a collecting bar support structure, several of which are spaced circumferentially around flange 3 and are fastened thereto.

Axial support members 12 are mounted on circumferential flange 3 and serve as supports to which armature bars 6 and 7 are lashed by suitable loops, typically made of glass roving impregnated with a curable resin, shown at 14. Conformable pads 13, also resin impregnated, separate the bars 7 from support members 12. Support members 12 are mounted on supports 12a so as to slide axially with respect to flange 3.

To add rigidity to the end winding support system, circumferential rings or hoops 15 are inserted between the axial support members and the armature bars, between inner and outer armature bars, and between windings 14 and inner armature bars 6. In prior art structures, these circumferential bands typically have been a combination of two parts. One part was a ring of rigid strength material having a channel in cross-section. The other part was a circumferential member within the ring channel and generally pliable so as to conform to irregularities as it abutted the armature bars and the spaces therebetween. Thus, the required strength and conformability was achieved by the use of such a two-part combination ring.

The foregoing description has merely described the setting of this invention. What is considered to be the essential characteristics thereof will now be described.

Rings or hoops 15 are made as follows. A body or core 20 is made of a resilient fibrous material of a fluffy nature such as Fabmat which is the trademark of a fabric base, glass mat, of low density and a spongy nature sold by Fiber Glass Industries, Inc., Amsterdam, N.Y. Around core 20 is wrapped a stocking or net of a high tensile strength fabric 21 as, for example, glass cloth. The Fabmat core with its glass cloth net are impregnated with a polymerizable resin liquid as, for example, epoxy or polyester resin. An outer wrapping film 22 for containing the entire mass of core material, net fabric, and resin together while curing is provided. One material for such a use is an impervious dielectric film of ethylene glycol terephthalate, sold by Du Pont under the trademark Mylar. This outside film prevents the liquid resin from sticking to adjacent generator structure outside of the hoop or ring itself. The inner core of Fabmat is inherently of some elasticity so as to provide a biasing force against adjacent structure while the resin with which it is permeated is curing.

The hoops 15 are installed at their various locations shown in FIG. 1, generally as follows:

The strip of Fabmat, net fabric, resin, and Mylar, which becomes a hoop, or ring, 15 is installed by placing it in its loose, pliable, uncured and elastic state, in a molding ring and then by clamping it consecutively around the circumference of the stator end windings, with care to insure that its alignment and thickness are maintained. The hoop, or ring, is then allowed to set or cure at room temperature by which curing it becomes a solid strong resilient ring member, while at the same time conforming in shape to the irregularities of adjacent surfaces.

The molding ring and clamps are then removed and the ring is lashed by loops 14 to the supporting members 12 and to the supported members 6 and 7. It will be observed from FIG. 1 that the rings 15 serve as the sole intermediate supporting structure between conductor and axial support or between conductor and conductor, while at the same time conforming completely to the irregularities imposed by the spaced members.

In another form of this invention, the resin is one which is cured by the application of heat so that when the above described process is carried out, the stator end and Fabmat hoop are baked until the resin is cured.

Thus it will be appreciated that an improved support structure of dielectric material has been herein disclosed which firmly supports the end windings of a generator stator while also being moldable to their configurations.

It will occur to others of ordinary skill in the art to make modifications of this invention which will remain within the concept and scope thereof and will not constitute patentable departure therefrom. Accordinly it is intended that the invention be not limited by the details in which it has been described but that it encompass all within the purview of the following claims.

What is claimed is:

1. A dynamoelectric machine stator defining a substantially cylindrical opening therethrough and comprising a plurality of circumferentially spaced stator bars longitudinally disposed in said stator and extending beyond the ends of the core of said stator, a plurality of outer axial support members mounted radially outward of said stator bars in circumferential relation on each end of said stator, and a ring consisting of resin-impregnated fabric material circumferentially mounted in abutting relation to at least some of said stator bars, said ring conforming to configurations of said abutting stator bars and resin-cured to a rigid state, said ring being lashed to said support members.

2. A dynamoelectric machine according to claim 1 wherein said ring is mounted radially inward of said stator bars.

3. A dynamoelectric machine according to claim 1 wherein said ring is mounted radially outward of said stator bars.

4. A dynomelectric machine according to claim 1 wherein said stator contains radially inner and radially outer stator bars and said ring is mounted between the end extensions of said inner and outer stator bars.

5. In a dynamoelectric machine having a stator including a plurality of coils with arcuately spaced end extensions and axial supports mounted in circumferential array on said stator radially outward of said extension,
a ring consisting of resin-impregnated fabric material circumferentially mounted in abutting relation to said coil end extensions and to said axial supports, said ring conforming to configurations of said abutting coil end extensions and of said axial supports, said ring being cured to a rigid state and lashed to said axial supports.

6. A stator for a dynamoelectric machine comprising a core having slots formed therein, stator bars in said slots having end turns projecting beyond the ends thereof, and means for rigidly supporting said end turns comprising a plurality of circumferentially spaced outer axial support members mounted to the frame of said stator radially outward of said bars,
a circumferential ring mounted radially inward of said outer axial support, said stator bars passing between and abutting both said ring and said outer axial support, said ring being of resin-impregnated fabric material and conforming to the configurations of said abutting armature bars and resin-cured to a rigid state, and means to anchor said ring relative to said outer axial support.

7. A circumferential support structure comprising a plurality of circumferentially spaced mounted support members, a ring of flexible conformable dielectric material, a plurality of circumferentially spaced supported members and means to anchor said ring and said supported members to said support members, said supported members located between said ring and said support members, said ring comprising a fibrous absorbent filler core, a surrounding high tensile strength fabric stocking, a curable resin permeating said core and said stocking, and a means to enclose said core, stocking, and resin to prevent leakage of said resin while said resin cures said ring to a rigid state.

8. A circumferential support structure according to claim 7 including an additional ring located between said support members and said supported members, said additional ring also being anchored to said support members.

9. A circumferential support structure according to claim 7 in which said supported members include radially inner and radially outer supported members connected at their end extensions, and further including an additional ring located between said inner and outer supported members.

References Cited

UNITED STATES PATENTS

| | | | |
|---|---|---|---|
| 2,602,829 | 7/1952 | Fromm | 310—260 |
| 2,885,581 | 5/1959 | Pileggi | 310—260 |
| 3,075,112 | 1/1963 | Anderson et al. | 310—260 |
| 3,089,048 | 5/1963 | Bahn et al. | 310—260 |

MILTON O. HIRSHFIELD, *Primary Examiner.*

L. L. SMITH, *Assistant Examiner.*